Figure 5:
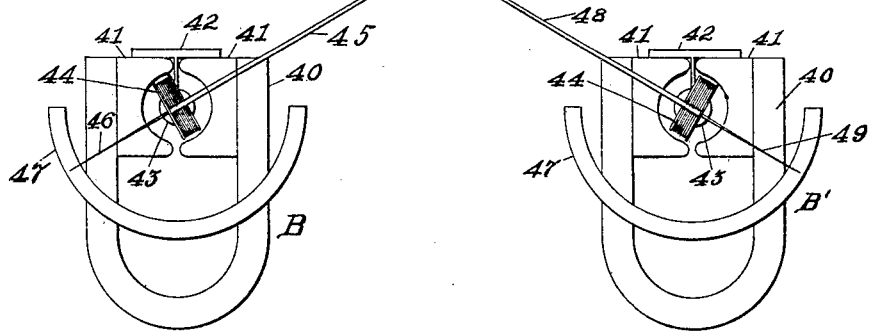

No. 736,557. PATENTED AUG. 18, 1903.
H. SHOEMAKER.
ELECTRICAL RANGE FINDER.
APPLICATION FILED JAN. 10, 1903.
NO MODEL. 4 SHEETS—SHEET 1.
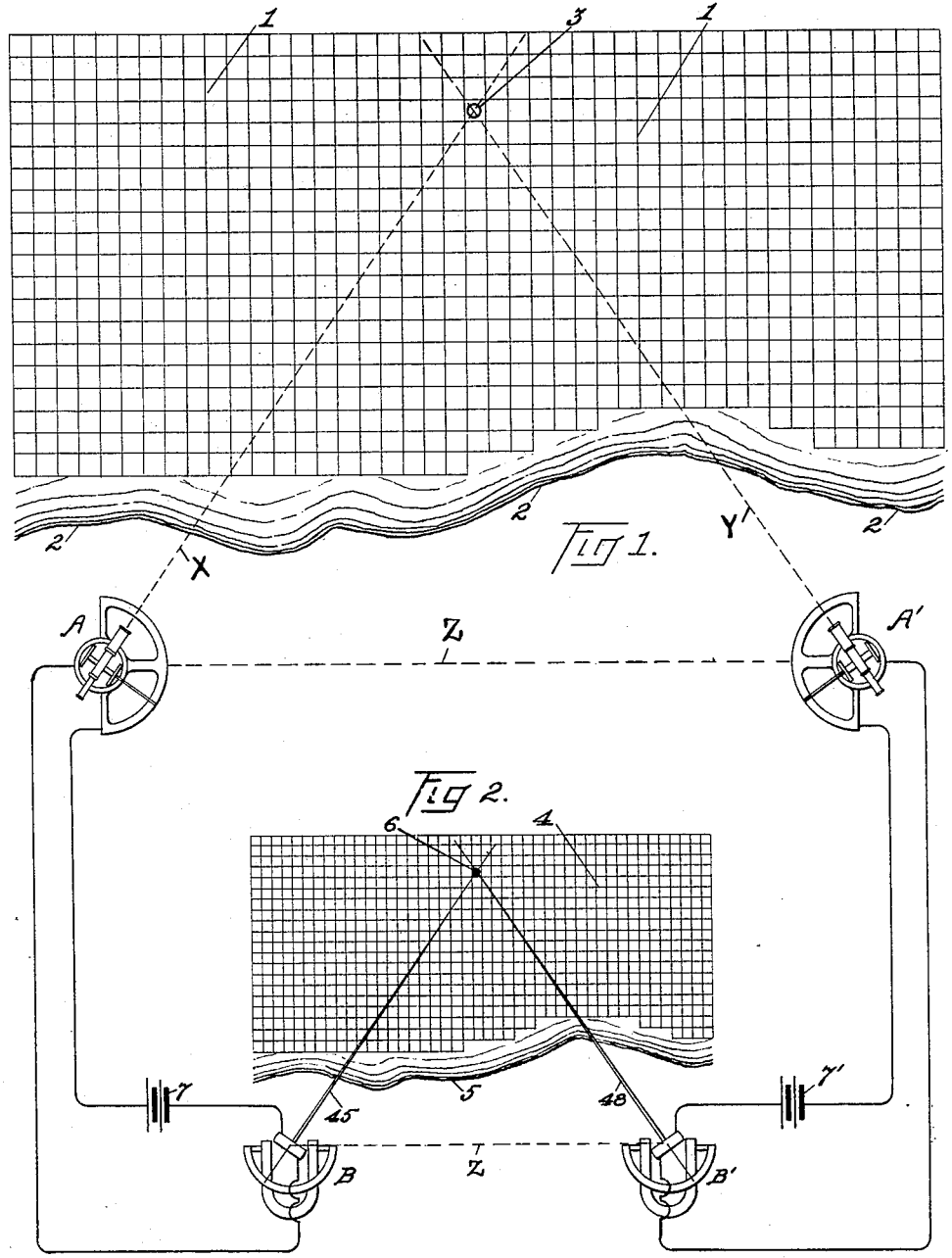

No. 736,557. PATENTED AUG. 18, 1903.
H. SHOEMAKER.
ELECTRICAL RANGE FINDER.
APPLICATION FILED JAN. 10, 1903.
NO MODEL. 4 SHEETS—SHEET 2.
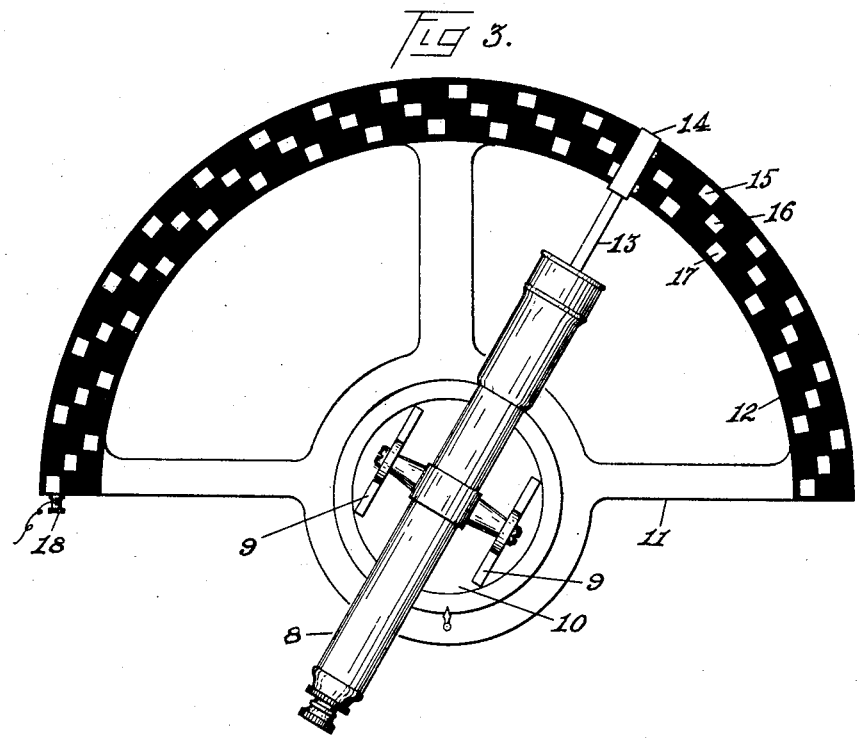
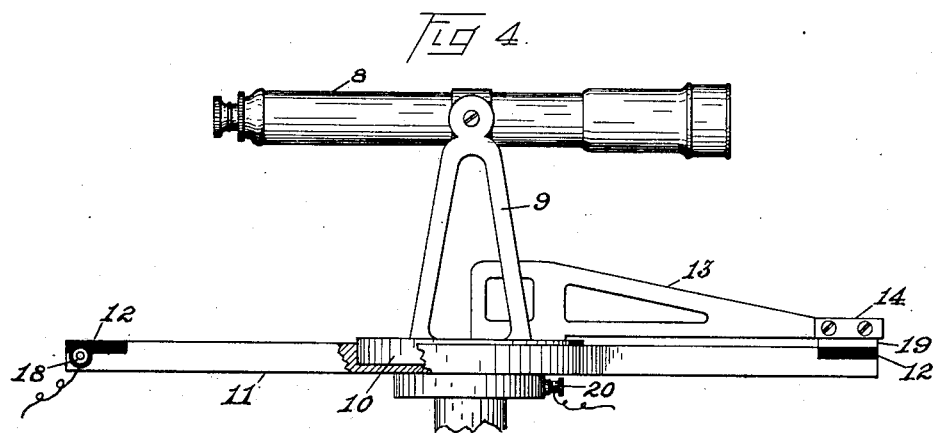

No. 736,557. PATENTED AUG. 18, 1903.
H. SHOEMAKER.
ELECTRICAL RANGE FINDER.
APPLICATION FILED JAN. 10, 1903.
NO MODEL. 4 SHEETS—SHEET 3.

WITNESSES:
James M. Sawyer
Alice T. Burbank

INVENTOR
Harry Shoemaker
BY
Cornelius D. Ehret
his ATTORNEY.

No. 736,557. PATENTED AUG. 18, 1903.
H. SHOEMAKER.
ELECTRICAL RANGE FINDER.
APPLICATION FILED JAN. 10, 1903.
NO MODEL. 4 SHEETS—SHEET 4.
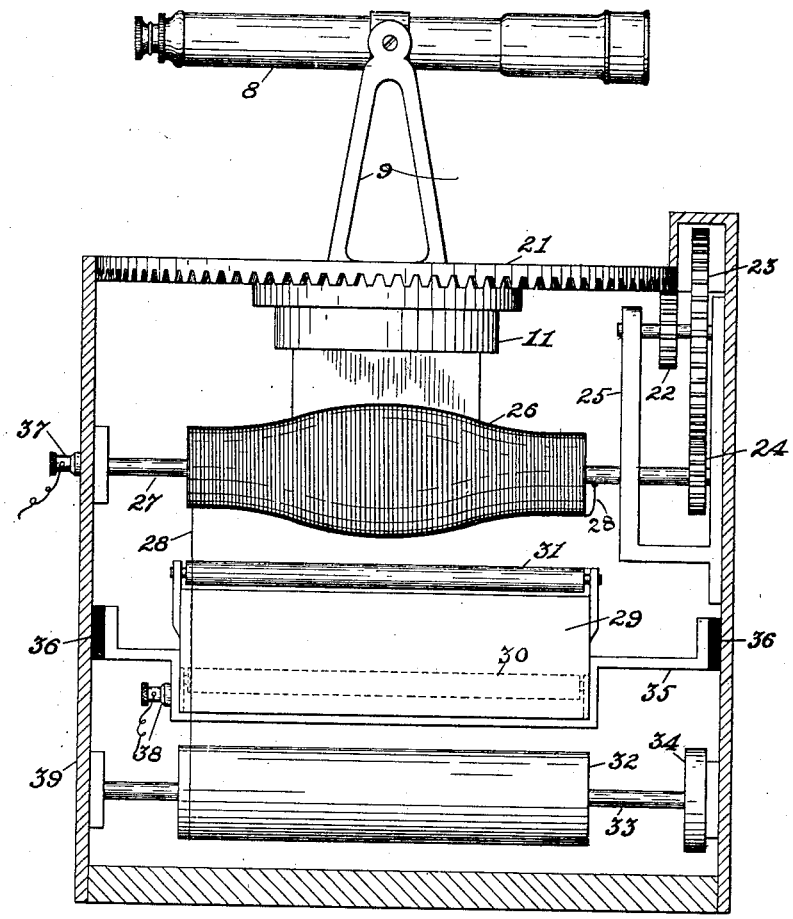
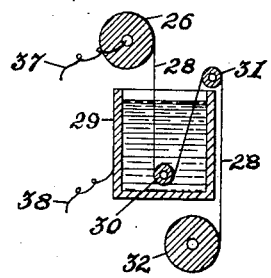
WITNESSES:
James M. Sawyer.
Alice F. Burrough.
INVENTOR
Harry Shoemaker
BY
Cornelius D. Ehret
His ATTORNEY.

No. 736,557.

Patented August 18, 1903.

UNITED STATES PATENT OFFICE.

HARRY SHOEMAKER, OF PHILADELPHIA, PENNSYLVANIA, ASSIGNOR OF ONE-HALF TO MARIE V. GEHRING, OF PHILADELPHIA, PENNSYLVANIA.

ELECTRICAL RANGE-FINDER.

SPECIFICATION forming part of Letters Patent No. 736,557, dated August 18, 1903.

Application filed January 10, 1903. Serial No. 138,478. (No model.)

*To all whom it may concern:*

Be it known that I, HARRY SHOEMAKER, a citizen of the United States, residing at Philadelphia, in the county of Philadelphia and State of Pennsylvania, have invented a new and useful Electrical Range-Finder, of which the following is a specification.

My invention relates to a system for determining the relative position of an object—as, for example, the position of a vessel with respect to fortifications.

The object of my invention is to indicate at any point or station the relative position of a distant object, so that an operator or gunner at such point or station may without observations of his own properly direct and control his apparatus.

My system and its apparatus constitute a range-finder whereby a gunner may be constantly advised of the relative position of the object upon which he is to train his gun, though such object may not be visible to him.

By my system two indicators are independently controlled by as many independent sighting instruments, and it is upon the resultant indications of these two indicators that the gunner depends for his information. Each sighting instrument controls its indicator by electrical means, and these indicators coöperate to indicate the point upon a chart, such point signifying to the gunner that the object at which he is to fire is located in the same relative position as this point on the chart. The sighting instruments comprise telescopes rotatable in a horizontal plane about a vertical axis and means operated by the motion of such telescope to vary a characteristic of an electric current. The electric current in the circuit of the instrument controlled by the telescope has a different characteristic or is of a different magnitude for each angular position of the telescope. Each indicating instrument is, in fact, a Deprez d'Arsonval galvanometer consisting, as is well known, of a permanent magnetic field in which is mounted for movement about its axis a coil connected in the circuit controlled by the sighting instrument. Attached to the movable coil is a long slender needle or pointer, which by my system will always be at the same angle with respect to some reference-line as between the longitudinal axis of the telescope and a corresponding reference-line. In other words, the needle or pointer of the indicator follows accurately and smoothly every movement of the telescope of the sighting instrument.

In my system I employ two sighting instruments and two indicators. Each sighting instrument is trained upon the distant ship or object, and this results in the indicating pointers or needles following the movements of their respective controlling-telescope and the point of intersection of the needles or pointers corresponding with the location of the distant ship or object.

My system may be better understood by reference to the accompanying drawings, in which—

Figure 6:
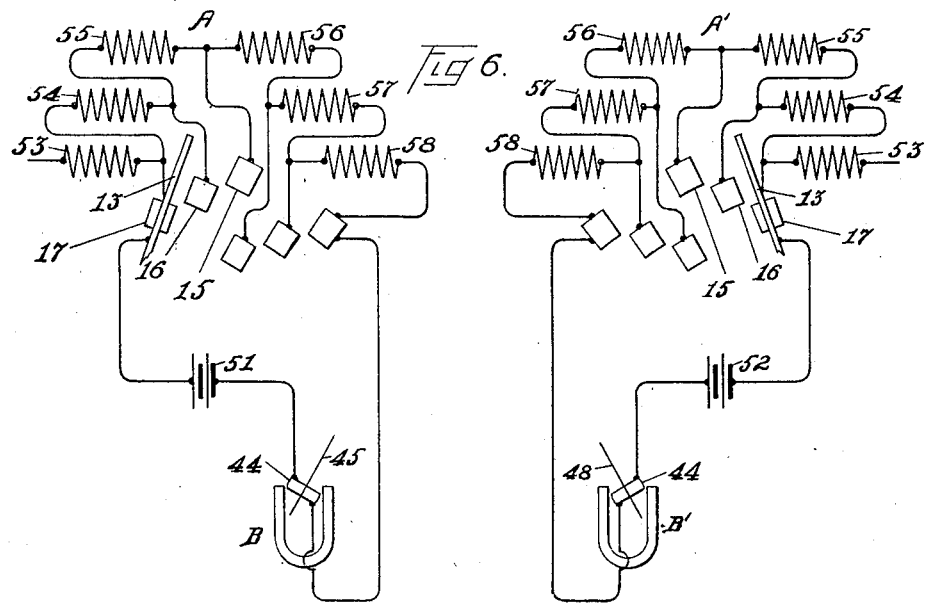

Figure 1 represents the sighting instruments erected in the vicinity of a body of water upon which is floating the object to be located. Fig. 2 represents the indicating apparatus. Fig. 3 is a plan view of a sighting instrument and the electrical contacts controlled thereby. Fig. 4 is a side elevation of a sighting instrument as shown in Fig. 3. Fig. 5 shows the two receiving-indicators in their relative operative positions. Fig. 6 is a diagrammatic view of the electrical circuits of my system when employing sighting instruments as shown in Fig. 3. Fig. 7 is a view of a modified type of sighting instrument. Fig. 8 is a diagrammatic view of the electrical apparatus shown in Fig. 7.

A and A' represent sighting instruments located in separated conning-towers near the shore-line 2 2, near which may be the guns which are to be trained upon an object, such as 3.

1 1 represent imaginary plots laid out upon the body of water to be controlled by the guns of the fortification.

B represents an indicating instrument controlled by the sighting instrument A, both included in the same electric circuit with the source of energy 7. Likewise, B' represents the indicator controlled by the sighting instrument A', both included in the same electric circuit with the source of energy 7'. These indicators B B' are within the fortifications and presumably near the gunners. These indicators B B' operate their respective pointers 45 and 48, which swing over or traverse the chart 4 5, which is a reproduction, upon a smaller scale, of the imaginary chart 1 1 in connection with the shore-line 2. The axes of the movable coil of the indicators B B' are at some chosen distance apart which is some known fraction of the distance between the vertical axes of the sighting instruments A A'. The chart 4 5 is drawn to a scale, therefore, such that any distances measured upon it will bear the same relation to the actual distances upon the water as the distance between the indicators B B' bears to the distance between the sighting instruments A A'. It follows, therefore, that the point of intersection 6 of the indicating-pointers 45 and 48 corresponds on the chart 4 5 with the true position of the object 3 upon the water. The gunner has, therefore, before him an indication of the relative position of the object upon which he is to train his guns. When the instruments A A' have been trained upon an object, as 3, we have a triangle determining the position of such object 3, the legs of said triangle being represented by the imaginary lines X Y Z, and at the indicating-station we have a triangle exactly similar to the ones just mentioned, the base $z$ corresponding with the base Z, the pointer 45 corresponding with the leg X, and the pointer 48 corresponding with the leg Y. Any change of shape in the triangle X Y Z is accompanied at the indicating-station by a similar change in the triangle 45 48 $z$.

The means I employ for operating the indicating instrument is a resistance-controller which changes the electrical resistance of each indicating-circuit for each position of the sighting-telescope. In an arc semicircular in extent I locate numerous contacts, as 15, 16, and 17, Fig. 3, located in insulating material 12. 8 is the telescope, mounted in the standards 9 upon a disk 10. The arms 11 support the arc-shaped piece for the electrical contacts, which of course remains stationary at all times. Extending from the telescope is an arm 13, carrying at its outer end a member 14, to which is secured a metallic brush 19. As the telescope 8 is rotated to any position in making an observation the brush 19 is also rotated or moved to a corresponding position, and in whatever position engages with some one contact of the contact-arc. One terminal of the electrical circuit connects with the frame of the telescope or, to all intents and purposes, with the brush 19. The remaining terminal is at the binding-post 18, which connects with the first section of the arc-shaped rheostat; between succeeding contacts or small segments or portions of resistance conductors, as is common in resistance boxes or rheostats. As the brush 19 moves in a counter-clockwise direction as viewed in Fig. 3 and away from the terminal 18 resistance is progressively cut into the circuit controlled by the telescope, or, in other words, the current strength in the circuit diminishes gradually. In practice the number of contacts or sections of resistance in the rheostat is very great, indeed, about six sections of resistance being employed for each degree of angular change of the telescope. In Fig. 6 these circuits are shown diagrammatically, that at the left corresponding with the sighting instrument A and that at the right with instrument A'. B is the indicating instrument whose movable coil is shown at 44 and whose pointer or needle is represented at 45. 13 represents the bar carrying the brush 19, adapted to move over the contacts 15 16 17, &c. In the position shown current flows from the battery 51 through the arm 13 to the contact 17, thence through the sections of resistance 54, 55, 56, 57, and 58 in series, and thence through the coil 44. Moving the telescope slightly in a clockwise direction current will flow through contact 16 in place of 17, thereby cutting out of circuit the resistance 54. This will result in a slight increase of the current through coil 44 and will be accompanied by a slight increase in the deflection of the pointer 45, also in a clockwise direction. The action of the sighting instrument A' is precisely similar except that a counter-clockwise rotation of the telescope causes the current in the circuit of the indicator B' to increase by small increments, which results in a slightly-greater deflection of the pointer 48, also in a counter-clockwise direction.

The indicating instruments are shown more clearly in detail in Fig. 5. In each instrument, 40 represents a permanent horseshoe-magnet supplied with soft-iron pole-pieces 41 41, whose opposing inner surfaces are truly circular and of very great length of arc. Supported in the space between the pole-pieces is a mass of soft iron 43, cylindrical in form and supported by a brass bracket 42. Embracing this iron cylinder and movable in the narrow space between such cylinder and the pole-pieces is the movable coil 44, capable of rotation about its axis upon pivots delicately jeweled. The motion of the coil 44 is opposed by flat spiral springs, which serve also to conduct current into and out of the movable coil. In order to cause the motion of the coil 44 to be aperiodic or dead beat, the coil is wound upon a continuous frame of aluminium or copper. 45 is a long slender pointer or needle secured to and actuated by the coil 44. 48 is the corresponding pointer or needle for the instrument B'. 47 represents a graduated arc-plate over which move the indicators 46 and 49 of the instruments B B', respectively. By means of these graduated arcs and needles readings in degrees may be taken directly from each instrument. By the structure here indicated, especially as relating to the pole-pieces, a very intense and uniform magnetic field is maintained, whereby equal increments of current through the coil 44 will produce equal increments in the perfection of such coil. In other words, the instrument is practically proportional in its deflections to the current passed through its coil. In the positions of the coils indicated in Fig. 5, however, the coils are approaching a region near the pole-tips, where the field begins to vary in its strength, and in consequence the deflections are no longer proportional to the current strength of the coil. The error or discrepancy from true proportionality for this portion is in the direction of too small a deflection. In order, therefore, that the deflection shall remain truly proportional, or rather shall be precisely similar to the movement of the telescope, it is necessary that the current through the coil 44 when in this position be increased by progressively-greater increments than when the coil extends from mid-pole to mid-pole. To secure these progressively-greater increments in the current, it is simply necessary (indicator B and sighting instrument A being now considered) to decrease progressively the resistance in the different sections of the rheostat which communicate with the contacts swept over by the brush 19 for the corresponding position of the telescope 8. The error of each indicator may be determined and compensated for in this manner, or the error may be determined once for all for indicators of a definite size and design, though the former method is preferable.

In Fig. 7, 8 represents the telescope mounted upon the standard 9, as in the previous cases. As the telescope 8 is rotated the gear-wheel 21 rotates the pinion 22, mounted upon the same shaft with the gear 23, which latter rotates the shaft 27 through the medium of the pinion 24. Upon the shaft 27 is a member 26, of insulating material, upon which is wrapped a metallic wire—such as iron, German silver, or manganin—the adjacent convolutions being carefully kept apart. This wire is represented by 28. The portion of the wire 28 which is not upon the body 26 extends downwardly into the tank 29, filled with mercury or other conducting liquid, passes around the roller 30, then out of the mercury and over the roller 31 and onto the drum 32, mounted upon the shaft 33. 34 is a clock-spring, whose purpose is to keep the wire 28 always stretched taut—that is, when wire is being unwound from the body 26 the drum 32 winds it up upon itself. The tank 29 is of metal and supported in the metallic bracket 35, insulated by pieces 36 from the metallic casing 39. One terminal of the circuit is at binding-post 37, which communicates electrically with the shaft 27, the member 26, and hence with the wire 28. The other terminal of the instrument is at binding-post 38, which is of course in electrical communication through the metal tank 29 with the mercury. The path of the current through the instrument is as follows: from binding-post 37 through shaft 27 to the end of the wire 28 at the right-hand end of the member 26, through the numerous convolutions or turns of wire 28 upon said body 26, thence through the straight portion of the wire 28, through the mercury and tank 29 to the binding-post 38. Turning the telescope 8 therefore increases or diminishes the length of wire 28 upon the member 26, and therefore smoothly varies the resistance of the circuit and the magnitude of the current passing through the corresponding indicator and not by steps, as in Fig. 3. As before stated, in the extreme positions the indicators no longer follow the proportional law, and to compensate for such error the member 26 is not of uniform diameter, but of varying diameter, as shown, whereby in the extreme positions the amount of wire 28 which is cut out of circuit is greater for equal increments of movement in the telescope 8. This corresponds in effect with the arrangement previously described as to the rheostat, in which, the extreme positions, the resistance sections are made smaller and smaller.

It is to be understood that the relative positions of the sighting and indicating instruments may be varied, and that more than two sighting instruments and indicators may be employed, and that the angular position of the coils of the indicators need not be as herein disclosed and described. It is to be further understood that in place of the rheostat devices herein shown any other means may be employed whereby the electric current may be controlled or varied.

What I claim is—

1. In a range-finder, a sighting instrument, a circuit controlled thereby, and controlled by said circuit an indicating instrument comprising a magnetic system, a coil supported and movable in the field of said system, and indicating means controlled by said coil.

2. In a range-finder, a plurality of sighting instruments, a circuit controlled by each sighting instrument, an indicating instrument controlled by each circuit, each indicating instrument comprising a magnetic system, a movable coil supported in the field of said system, and a pointer actuated by each coil, the position of an object being determined by the point of intersection of said pointers.

3. In a range-finder, a sighting instrument, a circuit, means controlled by said sighting instrument for varying the current in said circuit in accordance with the position of said instrument, an indicating instrument comprising a magnetic system, a coil included in said circuit and supported for movement in the field of said system, and a pointer moved by said coil to a position corresponding with the position of said sighting instrument.

4. In a range-finder, an indicating instrument, comprising a magnet, pole-pieces embracing relatively great arcs, a movable coil supported between said pole-pieces, and a pointer actuated by said coil, a sighting instrument, a circuit including said coil and means controlled by said sighting instrument for varying the current in said circuit by progressively-increasing increments as said coil approaches weaker portions of the magnetic field.

5. In a range-indicating instrument, a chart, a plurality of pointers capable of movement across said chart, a movable coil controlling each pointer, a magnet, and pole-pieces surrounding said coil.

6. In a range-indicating instrument, a chart, a plurality of pointers capable of movement across said chart, a movable coil controlling each pointer, a magnet, and pole-pieces surrounding said coil and embracing relatively great arcs.

7. In a range-finder, a sighting instrument, a circuit, an indicating instrument, a movable coil thereof supported in a magnetic field and included in said circuit, a resistance-conductor included in said circuit, means controlled by the movement of said sighting instrument for smoothly varying the amount of the resistance-conductor included in said circuit, and means for increasing the increments of variation of said resistance-conductor as said coil approaches weaker portions of said magnetic field.

8. In a range-finder, a sighting instrument, a circuit, an indicating instrument, a movable coil thereof supported in a magnetic field and included in said circuit, means controlled by said sighting instrument for varying the current in said circuit in accordance with the position of said sighting instrument, and means for compensating for the weaker action of said coil as it approaches weaker portions of said magnetic field, whereby said indicating instrument will indicate the position of said sighting instrument.

9. In combination, a sighting instrument, a circuit, a resistance-conductor included in said circuit, and means actuated by said sighting instrument for winding or unwinding said resistance-conductor as the position of said sighting instrument changes, whereby the current in said circuit has a different value for each position of the sighting instrument.

10. In combination, a telescope, a rotatable member supporting the same, a circuit, a resistance-conductor included in said circuit, a spool, and means actuated by said rotatable member for winding or unwinding said resistance-conductor onto or from said spool, whereby the current in said circuit has a different value for each position of said telescope.

11. In combination, a rotatable member, a telescope mounted thereon, a circuit, a resistance-wire included in said circuit, a spool of varying diameter, and means actuated by said rotatable member for winding said resistance-wire onto or unwinding it from said spool, whereby the current in said circuit is varied at greater rates between some positions of the telescope than between other positions thereof.

12. In a range-finder, a sighting instrument, a circuit, a resistance-conductor included in said circuit, means controlled by said sighting instrument for smoothly varying the amount of resistance included in said circuit in accordance with the position of said sighting instrument, an indicating instrument comprising magnetic system, a coil supported and movable in the field of said system, and indicating means controlled by said coil, said coil being included in said circuit.

HARRY SHOEMAKER.

Witnesses:
ALICE T. BURROUGH,
MAE HOFMANN.